Sept. 21, 1965 KINTARO KURITA 3,207,315
AUTOMATIC FILTER PLATE MOVING APPARATUS IN A FILTER PRESS
Filed July 17, 1961 3 Sheets-Sheet 1

INVENTOR
KINTARO KURITA,
BY Hall · Houghton
ATTORNEY

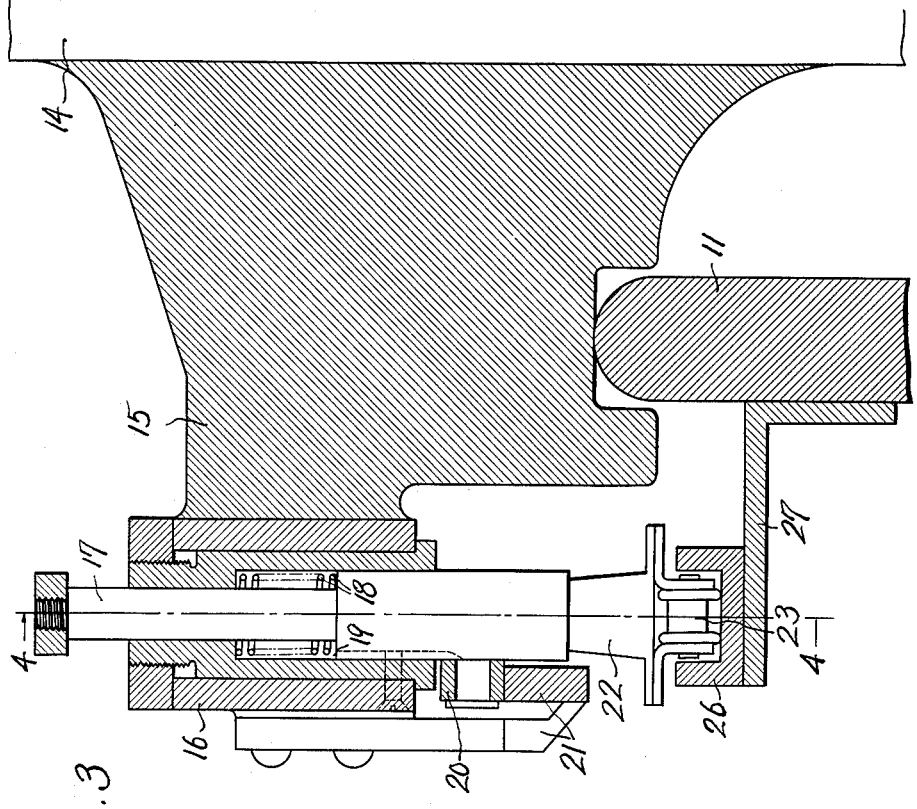
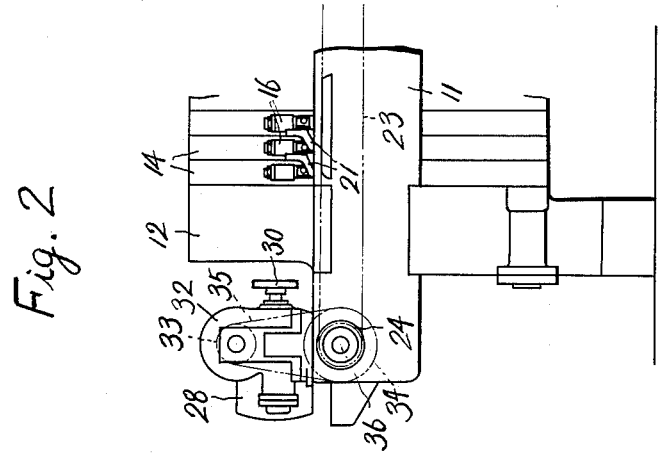

INVENTOR.
KINTARO KURITA
BY
Hall + Houghton

United States Patent Office 3,207,315
Patented Sept. 21, 1965

3,207,315
AUTOMATIC FILTER PLATE MOVING
APPARATUS IN A FILTER PRESS
Kintaro Kurita, 22 2-chome, Kitasakaigawa-cho,
Nishi-ku, Osaka, Japan
Filed July 17, 1961, Ser. No. 124,496
Claims priority, application Japan, May 18, 1961,
36/17,790
4 Claims. (Cl. 210—230)

This invention relates to an automatic filter plate moving apparatus in a filter press, more particularly to an apparatus in a filter press wherein filter plates automatically travel apart in succession for removing filter cake accumulated therein.

Various kinds of devices have heretofore been suggested for clearing a filter press of its filter cake by using oil pressure cylinders to make the filter plates travel in succession. However, none are found satisfactory, each having some defects of its own. The object of the present invention is to provide means for transferring filter plates correctly and smoothly in succession to remove filter cake therein through a device of rather simple construction.

With this object in view the present invention provides an automatic filter plate moving apparatus in a filter press, wherein on either arm of each filter plate is mounted a cylinder containing a piston. The piston is kept in contact with a cam of the next filter plate by the agency of a spring. A chain with pushers furnished thereon at a certain pitch is installed to travel beneath and parallel to the row of the pistons so that when a piston on a filter plate is pushed along by a pusher of the chain, the piston of the next filter plate supported on the cam of this filter plate may drop down to protrude in the way of traveling pushers. It is thereby sent away caught on the next pusher. Thus all of the filter plates are carried off in succession.

According to the present invention, filter plates in a filter press can be removed readily and correctly in succession through a device of rather simple construction.

Other and further objects of the present invention will become apparent from the following specification and claims taken together with the accompanying drawings in which is shown the preferred embodiment of the automatic filter plate moving apparatus in a filter press according to the present invention.

FIG. 2 is an elevation of a part of FIG. 1;

FIG. 3 is an enlarged sectional side view of FIG. 1 on the line 3—3;

Figure 1:
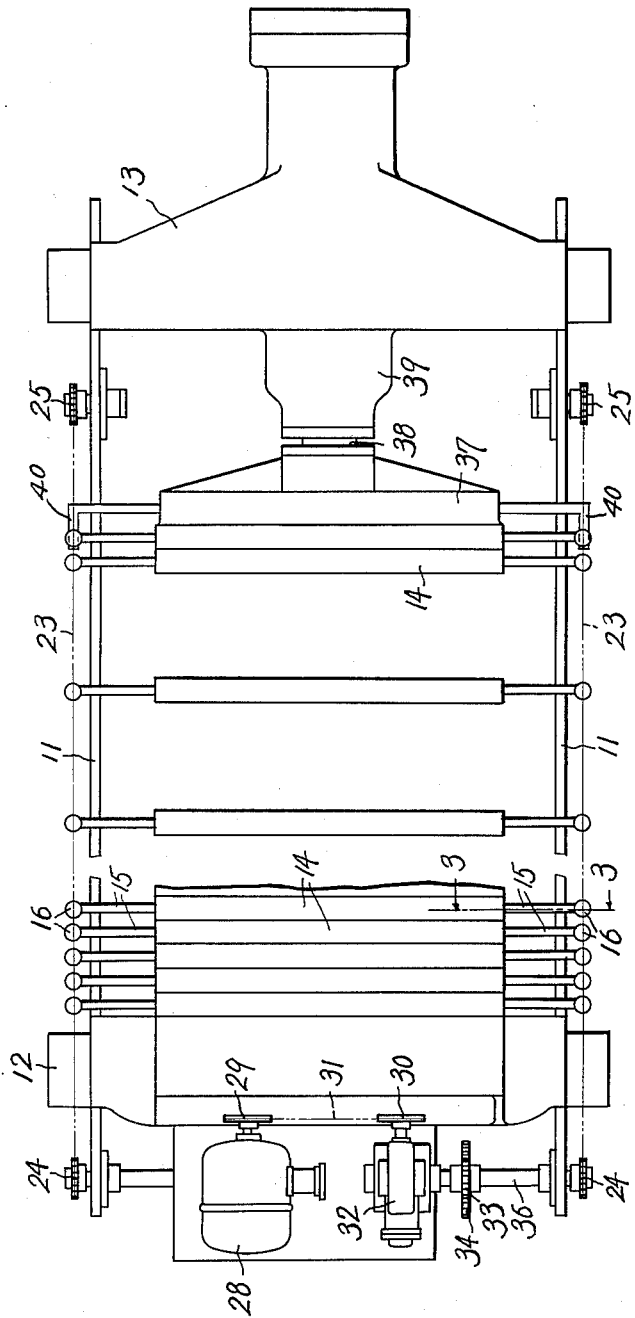
FIG. 1 is a general plan view of a filter press embodying the present invention.
Figure 4:
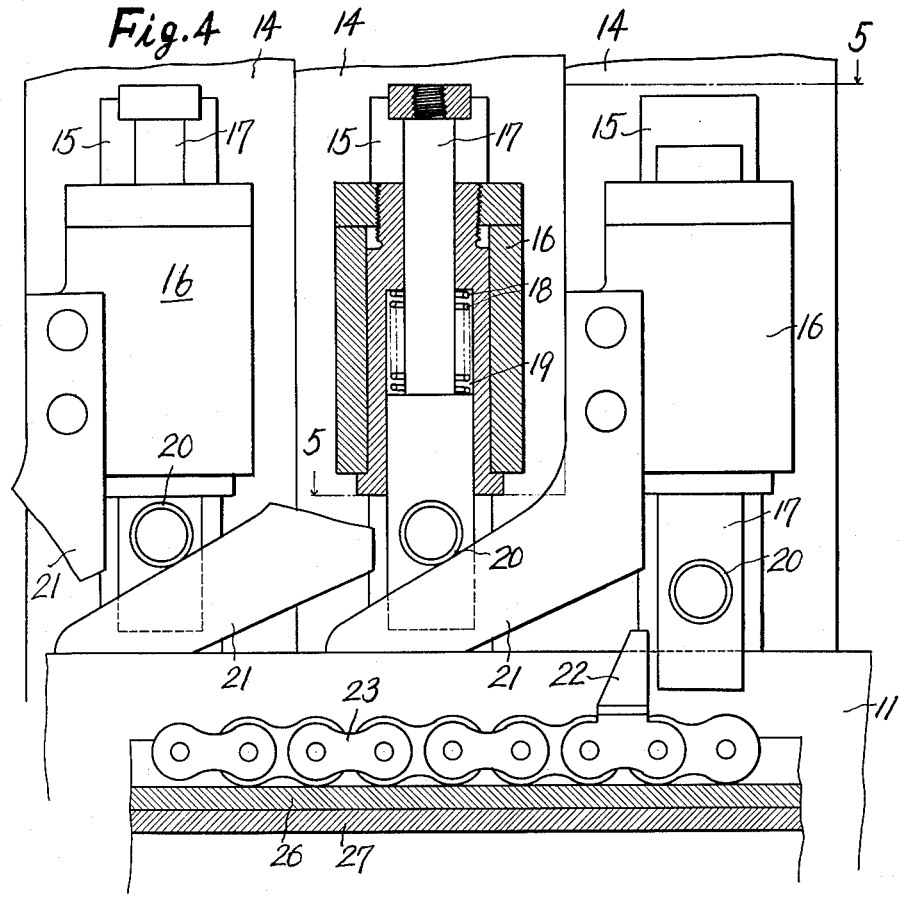
FIG. 4 is an elevation of FIG. 3 partly in section on the line 4—4.
Figure 5:
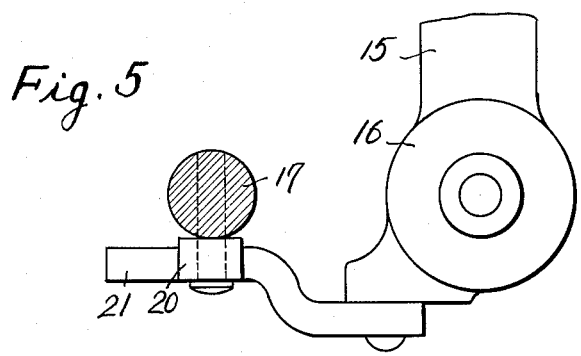
FIG. 5 is a sectional plan view of a part of FIG. 4 on the line 5—5.

In these drawings reference numeral 11 indicates a side board in a filter press, the ends thereof fixed on frames 12 and 13. Each filter plate 14 has its arms 15 mounted on the side boards 11. A multitude (that is, from tens of to over one hundred) of filter plates 14 are thus suspended in a row.

On each of these arms 15, 15 is fixed a follower, which includes a cylinder 16, wherein a piston 17 is inserted and pressed down by the agency of a helical spring 18 furnished in a cylinder bore 19. A roller 20, or follower element, is attached to the cylinder and supported on a cam 21 provided on the cylinder 16 of the next filter plate 14. Pushers 22 are furnished at a certain pitch on a chain 23 which, engaging with chain wheels 24, 25 moves on just beneath and parallel to the row of pistons 17, guided along in a gutter-shaped guide plate 26 attached to an attaching piece 27 fixed to the side board 11 so as to prevent slack, rolling or deviation.

Driven by a motor 28 and through a transmission mechanism consisting of belt wheels 29, 30, a belt 31, a reduction gear 32, chain wheels 33, 34 and a chain 35, a driving shaft 36 revolves and keeps the chain 23 going at an extremely low speed by means of the chain wheel 24.

A movable head 37 fixed to a piston rod 38 of an oil pressure cylinder 39 is provided with cams 40 identical to cams 21 on each of the filter plates.

Referring to the filter plate removing operation according to the present invention, when filter cake in each filter plate 14 accumulates to the saturation point, the motor 28 is started and at the same time the oil pressure cylinder 39 is driven to draw the movable head 37 up to the limit. On this the cam 21 of the movable head 37 gets away from the roller 20 of the first filter plate 14. The piston 17 thereof, pushed down by the agency of the spring 18 starts to get caught on the pusher 22, and then brought in contact with the movable head 37, the roller 20 of this filter plate 14 gets on the cam 21 of the movable head 37 along its inclined upper side and then keeps its upper position. When the first filter plate 14 starts to move and its cam 21 leaves the roller 20 of the next filter plate 14, the next piston 17 descends, gets caught on the following pusher 22 of the traveling chain 23 and coming into contact with the first filter plate 14 gets caught on the cam 21 thereof. When all the filter plates 14 have finished their removals in this way, they are returned to their former position, pushed back by the movable head 37 by the agency of the oil pressure cylinder 39 then driven.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

Having thus described my invention, what I claim and desire to secure by Letters Patent of the United States is:

1. A filter plate moving apparatus for a filter press comprising:
   (a) a frame;
   (b) a plurality of filter plates slidably mounted on said frame, each plate having a cam and a follower on each side thereof, each cam projecting below the follower of an adjacent plate when the plates are close together so that the cam of each plate controls the follower of a following plate; and
   (c) means on said frame for moving only those plates whose followers are free from engagement with the cams of their preceding plates.

2. Apparatus as defined in claim 1 wherein the follower engaging surface of each cam is inclined downwardly toward the plate having the follower associated therewith so that when two adjacent plates approach each other the follower of one moves up along the cam of the other and when two closely adjacent plates move away from each other the follower of one moves down along the cam of the other, said moving means including a chain with a plurality of push elements and arranged to travel along a path coincident with the position of the followers when they are disengaged from the cams of preceding elements.

3. Apparatus as defined in claim 2 wherein each follower includes a cylinder fixed to the associated filter plate, a piston in said cylinder and having a follower element on a lower portion thereof, and spring means biasing said follower element downwardly toward engagement with the cam of a preceding plate.

4. Apparatus as defined in claim 2 comprising a head movably mounted on said frame and having a cam thereon for the follower of the first filter plate and for holding said plates close together when in one position thereof and for allowing at least the follower of the first filter plate to move downwardly into the path of the push elements when in another position thereof.

References Cited by the Examiner

UNITED STATES PATENTS

| | | | |
|---|---|---|---|
| 1,020,746 | 3/12 | Dehler | 198—20 |
| 1,390,531 | 9/21 | Lockwood | 210—230 X |
| 1,478,612 | 12/23 | Lauke | 198—34 X |
| 2,405,947 | 8/46 | Gettig et al. | 198—23 |

REUBEN FRIEDMAN, *Primary Examiner.*

GEORGE D. MITCHELL, ROBERT F. BURNETT, HERBERT L. MARTIN, *Examiners.*